United States Patent [19]
Mulholland et al.

[11] Patent Number: 5,136,672
[45] Date of Patent: Aug. 4, 1992

[54] FIBER PROTECTOR

[75] Inventors: Denis G. Mulholland, Lancaster; Ronald R. Schaffer; Gary N. Warner, both of Harrisburg, all of Pa.

[73] Assignee: Amp Incorporated, Harrisburg, Pa.

[21] Appl. No.: 754,143

[22] Filed: Sep. 3, 1991

Related U.S. Application Data

[63] Continuation of Ser. No. 541,554, Jun. 21, 1990, abandoned.

[51] Int. Cl.⁵ .............................................. G02B 6/36
[52] U.S. Cl. .................................................. 385/53
[58] Field of Search ........................... 350/96.20–96.22

[56] References Cited

U.S. PATENT DOCUMENTS

| | | | |
|---|---|---|---|
| 4,411,491 | 10/1983 | Larkin et al. | 350/96.21 |
| 4,447,121 | 5/1984 | Cooper | 350/96.20 |
| 4,461,539 | 7/1984 | Bailey et al. | 350/96.20 X |
| 4,648,688 | 3/1987 | Ashman et al. | 350/96.20 |
| 4,872,736 | 10/1989 | Myers et al. | 350/96.20 |

FOREIGN PATENT DOCUMENTS 60-218932 9/1985 Japan .
62-26141 2/1987 Japan .

*Primary Examiner*—Akm E. Ullah

[57] ABSTRACT

The end of an optical fiber connector 3 and fiber 8 end are protected by a fiber protector body 9 during bonding of the fiber optic cable 6 to the connector 3. The protector body 9 comprises an elongated protective sleeve section 73 with axial bore 74 and terminates in means 75 for securing the protective sleeve 73 to the optical fiber connector 3. The means 75 for securing the protective sleeve 73 comprises an alignment sleeve 76 having a bore 77 extending with the axial bore 74 of the elongated protective sleeve section 73. Further the means 75 has a least two resilient catch pieces 78 extending from the elongated protective sleeve 73 and having the form of cantilever arms extending parallel to and on opposing side of the longitudinal axis of the alignment sleeve 76. The catch pieces 78 terminate in extending protrusions 80 and lip structures 81.

4 Claims, 3 Drawing Sheets

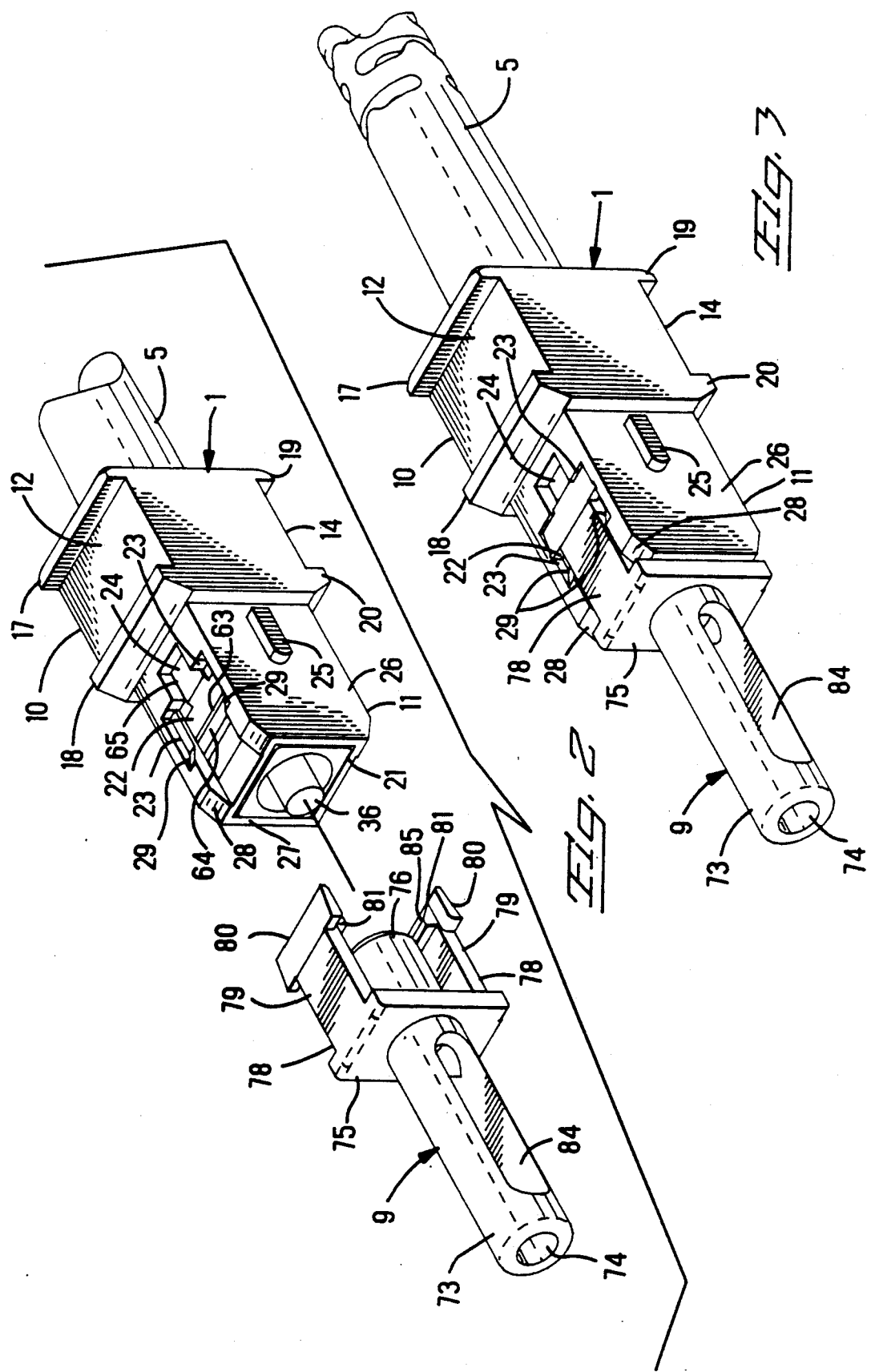

FIBER PROTECTOR

This application is a continuation of application Ser. No. 07/541,554 filed Jun. 21, 1990, now abandoned.

FIELD OF THE INVENTION

The present invention relates to a fiber protector for ferrule and optical fiber ends of a push-pull coupling type optical fiber connector.

BACKGROUND OF THE INVENTION

Various types of fiber optic connections between adapters and plugs are known, including screw lock types, bayonet locks and the push-on lock type also known as push-pull coupling type. Umeki, et al, Japanese Showa 60-218932 discloses a push-pull coupling type. It includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part The plug frame also has a finger grip mounted on its outside with raised parts. When the ferrule of the plug frame is inserted into or pulled from the alignment sleeve, the raised parts of the plug frame contact the protrusions of the cantilever form and push the resilient claws to the outside allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

Other connectors of the push-pull coupling type are disclosed by Iwasa, et al, Japanese Showa 62-26141; Myers, et al, U.S. Pat. No. 4,872,736; and co-pending application Ser. No. 07/491,755, filed Mar. 9, 1990.

Co-pending U.S. patent application Ser. No. 07/491,755 refers to Gerace, et al, U.S. patent application Ser. No. 07/159,151, published EPC Specification No. 0330399, Aug. 30, 1989, which relates to a sheath connector for an optical fiber. This connector may be adapted to a push-pull type connector by a plug housing in two sections with biasing surface and slot for mating with resilient catch pieces of an adapter as taught by co-pending application Ser. No. 07/491,755, filed Mar. 9,1990. The optical fiber connector of Gerace, which is adapted to a push-pull type connector by a plug housing, includes a shell and at least one reciprocating holder in the shell for holding the optical fiber. The optical fiber is connected to the reciprocating holder and is slidable within its load bearing portion with the load bearing portion anchored to the shell. The fiber is reciprocable together with the reciprocating holder and is reciprocable with respect to the shell and the load bearing portion. The connector further includes a sheath for the optical fiber on the reciprocating holder with the optical fiber extending along the sheath.

In assembling the connectors of push-pull coupling type, the optical fiber cable is passed successively through the interiors of a strain relief boot and a crimp ferrule and adhesive is then deposited into the body of the holder. The adhesive may be injected by a syringe. With the Gerace, et al, type of sheath connector, the needle is introduced into an end portion of the sheath which has been cut at an angle to provide an enlarged eliptical mouth. The rear portion of the sheath projects outwardly from the anchoring portion of the connector shell and sheaths the needle during entry and withdrawal. The adhesive is deposited near the front end of the connector body adjacent the alignment ferrule and remote from the open rear-end of the sheath. The sheath prevents leaking of the adhesive from the holder and prevents the adhesive from spreading over the spring and the shell. Following withdrawal of the needle, the alignment ferrule is pressed against a stationary surface, for example a table, causing the holder to be slidable displaced compressing a coil spring. Then with biasing of the spring, the ferrule and associated optical fiber extend somewhat forward of the face of the connector with the fiber end extending somewhat forward of the ferrule. This extending portion of the fiber must be handled delicately Any untoward movement from forces applied through mishandling will cause the fiber end to shift, unseating it from its fit within the connector, causing damage to the fiber body, and making it unsuitable for use or even causing the fiber to break requiring that the connector be reterminated. Hence, at this point a fiber protector is installed over the ferrule/-fiber end portion and the protector attached to the end of connector. The connector is then hung with tip down and is heated in a curing oven at, for example, 65° C. for four hours, with the protector acting as a splint to the fiber end and ferrule.

Use of conventional fiber protectors for attachment to connectors of push-pull types to cover the ferrule/fiber has not been satisfactory because a firm and encompassing fit has not been obtainable Poor fit oftentimes results in failure to protect the fiber end portion from unseating from the ferrule or from damage or breakage of the fiber itself and in some cases, a poor fitting protector itself contributes to the damage and breaking. The present invention relates to a fiber protector having characteristics that result in an improved and secure fit to fiber end and to ferrule of optical connectors. Particularly the fiber protector provides improved protection during the curing of connectors generally of the push-pull coupling type.

SUMMARY OF THE INVENTION

The present invention relates to a fiber protector for protecting the end of an optical fiber connector and fiber end during the bonding of an optical fiber cable to the connector. The body of the fiber connector comprises an elongated protective sleeve section with an axial bore. The protective sleeve section terminates in means for securing the section to the optical fiber connector. The means comprises an alignment sleeve having a longitudinal axis and with a bore extending with the axial bore of the elongated protective sleeve. The alignment sleeve may have annular beveled fromt edge. The means for securing further includes at least two resilient catch pieces. The catch pieces extend from the elongated protective sleeve and are in the form of cantilever arms extending parallel to and on opposing sides of the longitudinal axis of the alignment sleeve. The catch pieces have extending tab bodies and terminate in protursions and beveled lip structures. The lips of the resilient catch pieces may be beveled inwardly to facilitate lead-in to the openings of the plug housing of the fiber connector. The protursions of the resilient catch pieces amay be wider than the tab bodies of the catch pieces.

The fiber protector of the present invention is useable during the curing of connectors generally of the push-pull type. The fiber protector is particularly usable with a optical connector as described above which includes a sheath for the corresponding optical fiber member on the reciprocating holder and the corresponding optical fiber extends along the sheath after removal of a rear-end of the sheath. Further, anchoring means may connect the shell and the load bearing portion of the fiber cable for anchoring the load bearing portion to the shell A compressible biasing spring urges against the reciprocating holder and urges the shell to retract the sheath along the shell Finally, a strain relief may be provided encircling at least a portion of the shell and at least a portion of the cable projected from the shell. Use of the fiber protector of the present invention permits the connector and fiber number to be assembled prior to polishing.

With other connector systems, the fiber is first polished and then assembled. This is disadvantageous because the optical face of the fiber is often damaged during the assembly of the connector unless extreme care is taken. With polishing after assembly, a finely polished face is assured.

In this respect, the present invention is an improvement to a method for assembling a connector to an optical cable wherein the cable includes; at least one optical fiber and a load bearing portion, and wherein the connector includes; a shell and at least one reciprocating holder in the shell for holding a corresponding optical fiber The corresponding optical fiber is assembled in the reciprocating holder to extend from a front end of the connector with the fiber being slidable within the load bearing portion The load bearing portion and the shell are connected together, maintaining the corresponding optical fiber reciprocatable together with the reciprocating holder, and reciprocatable with respect to the shell and the load bearing portion. Adhesive is deposited in the holder. The adhesive, with the connector and the fiber, is subjected to curing and the fiber end face is polished. The improvement is in encompassing the end portion of the optical fiber within the elongated protective sleeve of the body of the present invention. The body is attached to the front end of the connector before the step of curing and removed before cleaving and polishing.

BRIEF DESCRIPTION OF THE DRAWINGS

FIG. 2 and 3 are different perspective views of the fiber protector and simplex connector.

DESCRIPTION OF A PREFERRED EMBODIMENT

Figure 1:
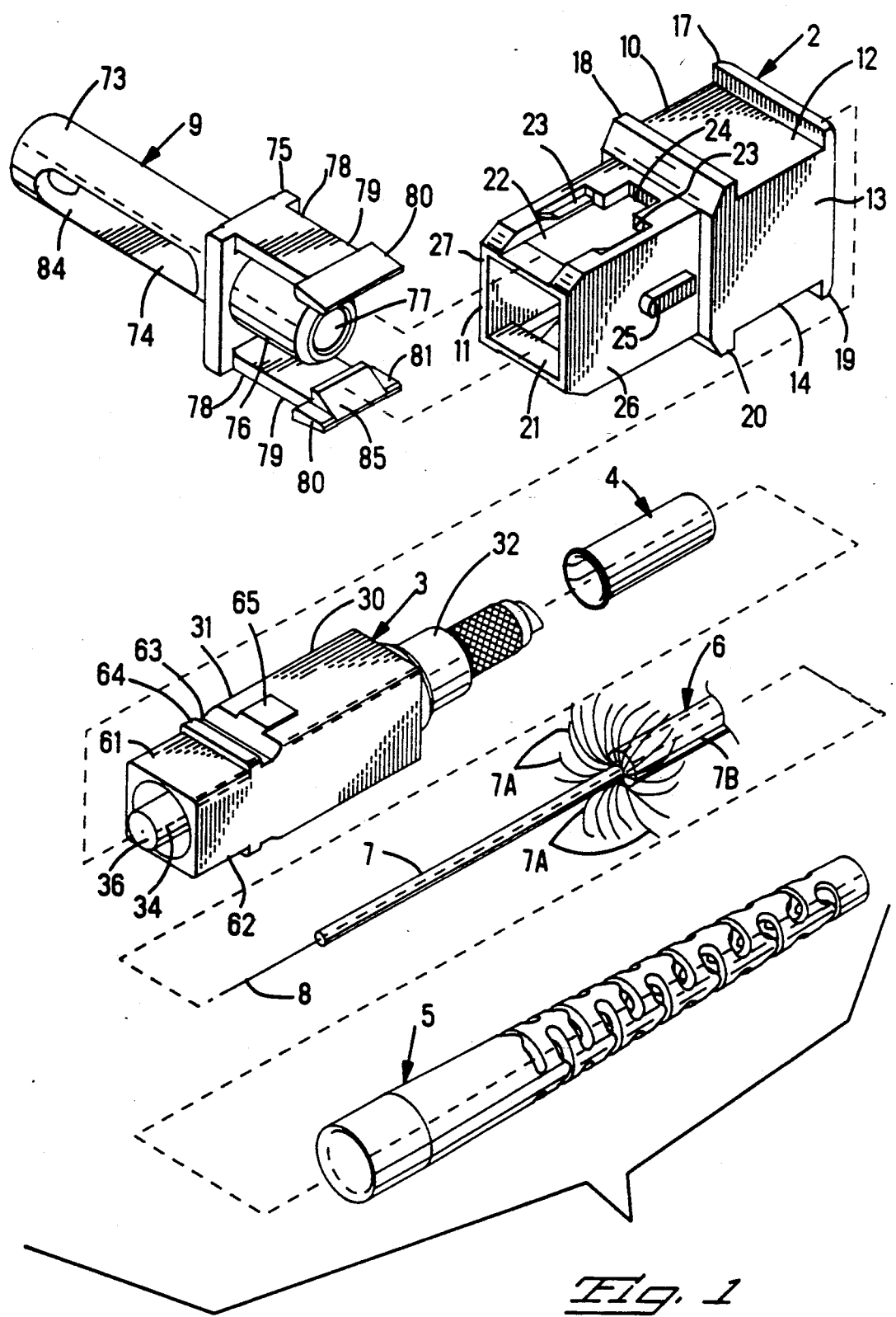
FIG. 1 is a perspective view, partially exploded, of a fiber protector of the present invention, an optical fiber cable, and a push-pull coupling plug of a simplex connector.
Figure 4:
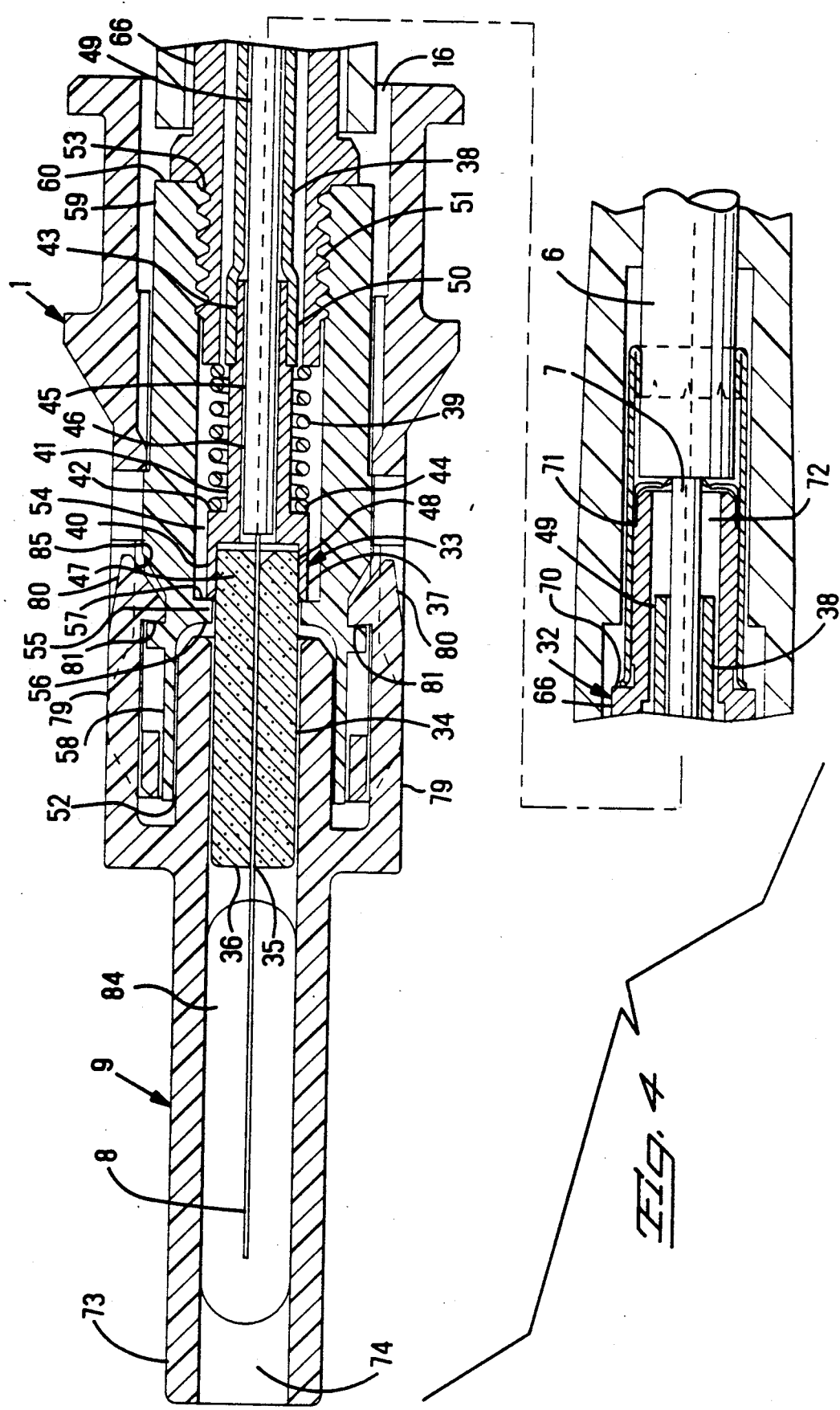
FIG. 4 is a cut-away view of the fiber connector coupled simplex connector.

The preferred embodiment of the present invention is a fiber protector adapted for fit to and protection of the front end and end face of an optical fiber and front end face of a ferrule of a optical fiber connector as shown in FIGS. 1, 2, 3, and 4. With reference to FIGS. 1, 2, 3, and 4, shown is a plug assembly 1 of the push-pull type comprising a plug housing 2 and a connector assembly 3. Shown also is crimp ferrule 4 and tubular strain relief body 5 for encompassing optical fiber cable 6. The cable 6 includes an elongated central optical fiber 8 concentrically encircled by a buffer 7, together comprising a buffer covered fiber 7, 8. The cable 6 further includes a load bearing portion 7A in the form of elongated strength members 7A that extend lengthwise of the cable 6. The strength members 7A are distributed over the outer diameter of the buffer covered fiber 8. The cable 6 further includes an outer jacket 7B of polymeric material enclosing the strength members 7A. Parts of the cable 6 are cut away as shown to provide; a length of fiber 8 projecting from the buffer 7 of the cable 6, and a length of the buffer covered fiber 7, 8 projecting from the strength members A, and lengths of the strength members 7A projecting from the jacket 7B. The buffer covered fiber 7, 8 is slidable within the jacket 7B and within the surrounding strength members 7A. Further shown is the fiber protector body 9 of the present invention.

As shown, the plug housing 2 of plug assembly 1 has rear section 10 and forward section 11. Rear section 10 is a tubular sleeve comprising four flat surface areas 12, 13, 14, and 15 (not shown) and formed passageway 16 for receiving connector assembly 3. Top surface 12 and bottom surface 14 have corresponding raised ridges 17 and 18 and 19 and 20 at edges of each surface 12 and 14. Forward section 11 is integral with rear section 12 to form a single body, the plug housing 2. Forward section 11 is also a tubular sleeve with passageway 21. It has shaped openings 22 with notches 23 and 24 to receive and dispose slots 63, ridges 64, and raised tabs 65 of connector assembly 3 as hereinafter described and tabs 25 on opposite opposing faces 26 for fit to the slot of an adapter when in use. Face 27 is beveled at front edges 28 and following edges 29 are beveled into notches 23.

As shown in FIGS. 1, 2, 3, and 4, the connector assembly 3 includes; a bipartite shell 30 comprised of a front plastic shell portion 31 and a rear metal shell portion 32. Also shown is a holder 33 for the optical fiber and buffer 7, 8, comprised of a ceramic alignment ferrule 34, having bore 35, and front end 36 and further including metal body 37, sheath 38, and biasing spring 39 of coil form.

The metal body 37 of holder 33 includes an enlarged front end 40 with an external hexagonal cross section, a reduced external diameter intermediate portion 41 intersecting at a rear facing shoulder 42 of the enlarged front end 40, and a rear end 43 with a reduced external diameter. The coil spring 39 is assembled as shown, to encircle the reduced external diameter portion 41 with a front end 44 of the coil spring 39 engaged and biased against the shoulder 42 The metal body 37 further includes an axial passageway 45 extending from the rear end 43. The passageway 45 has axial bore 46 and an enlarged diameter counterbore 47 in the front end 40. The counterbore 47 is aligned to receive a rear end 48 of ceramic alignment ferrule 32 which is press fit into the counterbore 47.

The sheath 38 is a length of flexible plastic or metal tubing having a hollow interior 49, a front end 50 assembled to encircle the reduced diameter rear end 43 of the metal body 37, and a rear end portion 51. The sheath 38 is held onto the body 37 by friction or interference fit.

The front plastic shell portion 31 of connector assembly 3 includes an axial cavity 52 having an enlarged diameter rear end 53 that is internally threaded, an intermediate portion 54 having a hexagon shaped periphery, and a reduced diameter front portion 55 extending through an end wall 56 of the front body portion 31. Enlarged diameter rear end 53 is internally threaded for fit of rear shell portion 32 as hereinafter described. However, it should be pointed out that although this present embodiment shows attachment by threading, rear shell portion 32 may be attached to front shell portion 31 by other conventional means such as by means of glue or adhesive or ultrasonic connection of one part to the other. A rear facing, radially extending internal shoulder 57 is defined at the intersection of the diameter portions 54 and 55. A rectangular hood 58 with an enlarged internal diameter extends forwardly from the front of the end wall 56. Further, the front shell portion 31 includes a rear end 59 forming a rear facing external shoulder 60.

Referring to FIGS. 1, 2, and 3, front shell portion 31 at the upper 61 and lower 62 surfaces of its outer profile has slots 63 and ridges 64 for engaging the lips 81 of resilient catch pieces 77 of polishing fixture 9, described below, and tabs 65 which impose outwardly. When connector assembly 3 is fitted within plug housing 2, slots 63 and ridges 64 are exposed by shaped openings 22 of the forward section 11 of plug housing 2. Tabs 65 nestle into notches 24 of the shaped openings 22 and ridges 64 fit into notches 23 to prevent connector assembly 3 from escaping out of plug housing 2.

The rear metal shell 32 of connector assembly 3 includes a front end 66, with an externally threaded forward portion 67. The front end 66 extends to a front facing external shoulder 68 defined by an exterior circumferential flange 69, a rear facing external shoulder 70 forward of a reduced external diameter end portion 71. The reduced diameter end portion 71 defines a cable anchoring portion. Rear shell portion 32 has axial passageway 72.

The holder 33 and the biasing spring 39 are assembled together and are assembled into the cavity 52 of the front shell portion 31, with the alignment ferrule 34 projecting through the end wall 56, forward of the end wall 56, and the hood 58, and with the sheath 38 projecting outwardly of the rear end 71 of the rear shell portion 32. The axial passageway 72 of the rear shell portion 32 is slidable assembled over the sheath 38 and is threadably advanced along the internally threaded rear end 59 of the front body portion 31 until the shoulder 68 engages the rear end 59 of the front shell portion 31. The biasing spring 39 is in compression between the front end 66 of the rear shell portion 32 and the shoulder 42 of the metal body 37. Thereby the holder 33 is biased forward by the spring 39 and is mounted for axial slidable displacement and reciprocation with respect to the bipartite shell 30. The hexagonal front end 40 of the metal body 37 is confined by the hexagonal periphery of the cavity 52 to prevent rotation of the holder 33 in the cavity 52. The fiber protector body 9 for protecting the end of the optical fiber connector and fiber end includes an elongated protective sleeve section 73 with axial bore 74. The sleeve section 73 terminates in means 75 for securing the protective sleeve 73 to the plug assembly 1 and to the end of the optical fiber number 8. The connecting means 75 includes an alignment sleeve 76 having bore 77 extending with the axial bore 74 of the elongated protective sleeve section 74. Further shown are two resilient catch pieces 78 extending from the elongated protective sleeve section 73. Each catch piece 78 is of cantilever form having tab section 79. The catch pieces 78 extend parallel to and on opposing sides of the longitudinal axis of the alignment sleeve 76. Each catch piece 78 terminates in protrusion 80 and lip structure 81. In the embodiment shown, a single surface 85 is beveled. However in another embodiment the lip 81 would have side bevels to facilitate lead-in to shaped passageway 21 of plug housing 2 as fiber protector body 9 is connected to plug housing 2 as hereinafter described. The body 9 at sleeve section 73, has slot 84 for visual inspection of the fiber, before, during, and after curing.

Assembly of the connector assembly 3 to the optical fiber cable 6 is described as follows. The cable 6 is passed successively along the interiors of the strain relief boot 5 and the crimp ferrule 4. A quantity of a known, commercially available adhesive is deposited in the metal body 37 of the holder 33. For example, the adhesive may be injected by a syringe having an elongated hollow needle. The needle is introduced into the rear portion 51 of the open tubular sheath 38. The rear end portion 51 of the sheath 38 projects outwardly from the cable anchoring portion 71 of the shell 30, and sheaths the needle during entry and withdrawal from the sheath 38. The shell 30 is protected against touching by the needle and against deposition of adhesive The needle is passed substantially along the interior of the sheath 38 before depositing the quantity of adhesive within the metal body 37 of the holder 33. The adhesive is deposited near the front end 40 of the metal body 37, adjacent to the alignment ferrule 34 and remote from the open rear end portion 51 of the sheath 38. The sheath 38 prevents leaking of the adhesive from the holder 33 and prevents the adhesive from spreading over the spring 39 and the shell 30.

If the sheath 38 is flexible plastic, then following withdrawal of the needle, the alignment ferrule 34 is pressed against a stationary surface, for example, a table, not shown, causing the holder 33 to be slidable displaced, compressing the coil spring 39, and projecting the rear end portion 48 of the sheath 38 further outward from the rear end 71 of the rear shell portion 32. The projecting rear end portion 51 of the sheath 38 is then cut away and removed from the connector assembly 3. Upon expansion of the coils of the biasing spring 39, the sheath 38 is retracted within the shell 30. The buffer covered fiber 7, 8 of the cable 6 is assembled into the rear end 71 of the metal shell 32 and into and along the sheath 38. The sheath 38 internal diameter receives and guides the buffer covered fiber 7, 8 along the passageway 45 of the body 37. The entry of the passageway 45 guides the fiber 8 of the cable 6 into the bore 46 of the alignment ferrule 34. The periphery of the entry encircles and supports the buffer covered fiber 7, 8. The front end 76 of the fiber 8 is exposed at a front end of the bore 35 of the ferrule 34 and is finished with an optical face as hereinafter described. The sheath 38 closely encircles the buffer covered fiber 7, 8 to prevent wicking of the adhesive along the buffer covered fiber 7, 8 to such an extent that adhesive would leak from the open rear end of the sheath 38. The adhesive will be brought into contact with and will coat the fiber 8 and the buffer covered fiber 7, 8, and further, the adhesive will be urged forward of the holder 33 by the buffer covered fiber 7, 8, as the buffer covered fiber 7, 8 moves forward of the sheath 38 and of the body 37 and of the alignment ferrule 34. It is not necessary for the adhesive to wick in a direction rearward of the buffer covered fiber 7, 8 or rearward of the holder 33, since the adhesive is desired only to bond the buffer covered fiber 7, 8 within the holder 33, and the fiber 8 in the alignment ferrule 34.

The internal diameter of the shell rear end 71 is smaller than the external diameter of the cable jacket 7B. Thus, the jacket 7B remains outside of the shell 30, while the shell rear end 71 opposes a front end of the cable jacket 7B. The strength members 7A are placed to overlap the exterior of the shell rear end 71. The crimp ferrule 4 is displaced along the cable 6 to a position concentrically encircling the shell rear end 71. Pressure is radially applied on the crimp ferrule 4 to compress the ferrule radially inward to clamp the strength members 7A between the ferrule 4 and the shell rear end 71. Thereby, the strength members 7A are anchored to the shell rear end 71. The strain relief boot 5 is advanced along the cable 6 to encircle the ferrule 4 and the jacket 7B of the cable 6 where the jacket 7B projects adjacent to the shell 30.

At this point the fiber protector body 9 is installed over the connector/fiber 3, 8 ends by sliding the ferrule 34 and fiber 8 end into the axial bore 74 of protective sleeve section 73, from the end 82 terminating in the securing means, forward toward the rear-end 83 of the protective sleeve section 73. The advancement is continued until each beveled leading edge 27 contacts a respective beveled leading edge of each protrusion 80 of each catch piece 78 of the securing means of the fiber protector body 9. As advancement is continued, each catch piece 78 is caused to rise along the bevel 27 with lip 81 passing over each ridge 62 and further caused to seat within each of slot 61 of front shell portion 29. The combination of connector assembly 3, including fiber 8 and fiber protector body 9, is then hung vertically with rear-end 83 down within a curing oven and heated at 65° C. for four hours. Before, during and after curing, the fiber number 8 may be visually observed through slot 84 to assure that the fiber is not damaged.

After curing the protector body 9 may be removed by rearward force which causes each beveveled following edge 29 to impose against each protrusion 80 of the protector body 9 to lift each catch piece 78 thus disengaging each of lip 81 from respective slot 63 and ridge 64 of connector assembly 3 thereby permitting withdrawal of the plug assembly 1 form the protector body 9.

After curing, cleaving and polishing, the buffer covered fiber 7, 8 and the holder 33 have been joined together as an unit by the adhesive for reciprocation and axial slidable displacement with respect to the shell 30, the strength members 7A and the jacket 7B of the cable 6. The end 36 of; the alignment ferrule 34 engages a portion of the complimentary connector 3 and is slidable biased rearwardly of the connector 3 against the bias of the coil spring 39. The bias of the coil spring 39 will urge the end 36 of the ferrule 34 in a direction forward of the connector 3 and will engage against a portion of the complimentary connector, to maintain a desired alignment of the optical face of the fiber 8 with the portion of the complementary connector.

While what has been described constitutes a presently preferred embodiment, it should be recognized that the present invention may take other forms, for example, the optical fiber connector 3 may be other than the push-pull type of connector described by copending application Ser. No. 07/491,755, filed Mar. 9, 1990. Further the body 9 for protecting the end of the optical fiber connector 3 and fiber 8 end may be in other forms so long as it includes an elongated protective sleeve section 73 with axial bore 74 and the sleeve section 73 terminates in means 75 for securing the section 73 to the optical fiber connector 3; and the means 75 comprises an alignment sleeve 76 having a bore 77 extending with the axial bore 74 of the elongated protective sleeve section 73; and further comprises at least two resilient catch pieces 78 of cantilever form extending from the elongated protective sleeve 73 parallel to and on opposing sides of the longitudinal axis of the alignment sleeve 73 and terminating in extending protrusions 80 and lip structures 81. Accordingly, it should be understood that the invention is to be limited only in so far as required by the scope of the following claims.

We claim:

1. A protector for an optical fiber of an optical fiber cable connected to an optical connector having a holder for said optical fiber of the cable, the fiber projecting outwardly from the holder, the protector comprising: a body having an alignment sleeve and a sleeve section and means for disconnectably connecting the alignment sleeve to said optical connector, the alignment sleeve receiving the holder, and the sleeve section receiving the optical fiber projecting from the holder.

2. A protector as recited in claim 1, and further including: an inspection slot in the sleeve section for observing the optical fiber projecting from the holder.

3. A protector as recited in claim 1 or 2, wherein, said means have protrusions with beveled surfaces to facilitate lead in to passageways of a plug housing of said optical connector.

4. A protector as recited in claim 1 or 2, wherein, said means have extending tabs and protrusions from lip structures on said extending tabs.

* * * * *